United States Patent
Choi et al.

(10) Patent No.: US 8,268,205 B2
(45) Date of Patent: Sep. 18, 2012

(54) METHOD FOR FABRICATING INJECTION-MOLDED PRODUCT

(75) Inventors: Jong-Min Choi, Seoul (KR); Kwang-Jin Bae, Gyeongsangbuk-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 12/582,957

(22) Filed: Oct. 21, 2009

(65) Prior Publication Data

US 2010/0096771 A1      Apr. 22, 2010

(30) Foreign Application Priority Data

Oct. 22, 2008 (KR) .................. 10-2008-0103630

(51) Int. Cl.
B29C 45/16      (2006.01)
(52) U.S. Cl. .......................... 264/1.31; 264/249; 264/255
(58) Field of Classification Search .................. 264/255, 264/249, 1.31, 1.34
See application file for complete search history.

(56) References Cited

U.S. PATENT DOCUMENTS

| | | | | |
|---|---|---|---|---|
| 2,250,958 | A * | 7/1941 | Kautter et al. | 264/247 |
| 7,551,949 | B2 * | 6/2009 | Schworm | 455/575.1 |
| 2003/0216125 | A1 * | 11/2003 | Ward et al. | 455/95 |
| 2005/0003159 | A1 | 1/2005 | Ikeda et al. | |
| 2006/0209502 | A1 * | 9/2006 | Sakata et al. | 361/681 |
| 2008/0199616 | A1 * | 8/2008 | Wu | 427/256 |
| 2009/0061145 | A1 | 3/2009 | Lin | |
| 2009/0085235 | A1 * | 4/2009 | Burkle et al. | 264/1.24 |

FOREIGN PATENT DOCUMENTS

| | | |
|---|---|---|
| DE | 2207890 | 8/1973 |
| DE | 8904240 | 5/1989 |
| DE | 19642648 | 4/1998 |
| DE | 2004-050501 | 2/2006 |
| EP | 1190831 | 3/2002 |
| EP | 1705152 | 9/2006 |
| JP | 2003-019731 | 1/2003 |
| WO | WO 00/24421 | 5/2000 |

OTHER PUBLICATIONS

Menges et al., How to Make Injection Molds, third edition, 2001, Hanser Publishers, pp. 54-68.*
Buckmaster, D.; "Leichter Und Lichter;" Plastverabeiter, Huethig GMBH, vol. 57; Jan. 1, 2006; XP001246844.
"Polycarbonat und Seine Blends fur Karosseriebauteile;" ATZ Automobiletechnische Zeitschrift; Nov. 1, 2005; XP001246848.

* cited by examiner

*Primary Examiner* — Jill Heitbrink
(74) *Attorney, Agent, or Firm* — Cha & Reiter, LLC

(57) ABSTRACT

A method for fabricating an injection-molded product for a mold in which a pattern carved therein is prepared. An interim injection-molded product with a pattern arranged on an inner face thereof is fabricated using the mold having the carved pattern. Paint or a coloring agent is deposited on the inner face of the molded interim injection-molded product. The pattern on the injection-molded product finished by depositing paint is visible from an exterior of the finished product.

8 Claims, 5 Drawing Sheets

METHOD FOR FABRICATING INJECTION-MOLDED PRODUCT

CLAIM OF PRIORITY

This application claims the benefit under 35 U.S.C. §119(a) of a Korean Patent Application filed in the Korean Intellectual Property Office on Oct. 22, 2008 and assigned Serial No. 10-2008-0103630, the entire disclosure of which is hereby incorporated by reference in its entirety.

BACKGROUND OF THE INVENTION

1. Field of the Invention

The present invention relates to injection-molded products fabricated with synthetic resins. More particularly, the present invention relates to a method for fabricating injection-molded products whose exterior design can be diversified and also form structures such as coupling pieces for coupling with a counterpart, i.e. another injection-molded product, on the face where the 3D pattern is formed.

2. Description of the Related Art

In general, the term 'injection-molded product' refers to a case or the like having a specific shape, fabricated by melting synthetic resins or plastics and injecting them into a mold. Most goods fabricated with synthetic resins are used in everyday life, including home appliances, portions of mobile phones and/or car interior materials, just to name a few items made by injection molding.

Recently, various kinds of portable electronic devices, including cellular phones, MP3 players, portable multimedia players and portable game consoles, have been become highly-commercialized, and injection-molded products are generally used as external cases for such portable electronic devices. Meanwhile, there is a tendency that with the increasing use of these portable electronic devices, users not only enjoy specific functions of the portable electronic devices, but also the portable electronic devices double as fashion items. Therefore, manufactures of the portable electronic devices are devoting themselves to beautifying and diversifying designs of the devices.

Electronic devices having metallic cases have also appeared as a result of the effort to make the appearance of such devices more fashionable. However, a significant amount of research and development costs, as well as production costs, are required to well develop fashionable covers/appearances for electronic device that address such problems as electric leakage and interference of electromagnetic waves, which occur in electronic devices, and to produce marketable manufactured goods. Therefore, a manufacturing method of forming visual Three-Dimensional (3D) patterns on injection-molded products using an in-mold technology, i.e. a technology of transcribing an ink layer onto the rear face of the injection-molded products, is used to beautify designs of portable electronic devices while minimizing an increase in the costs.

FIG. 1 illustrates a conventional process of forming a 3D pattern by transcribing an ink layer onto the rear face of an injection-molded product 11, and FIG. 2 illustrates a structure in which the injection-molded product 11 with a 3D pattern formed thereon is mounted on an external case 13.

Referring to FIG. 1, in order to form a 3D pattern on the rear face of the injection-molded product 11, the injection-molded product 11 is fabricated by injecting a molten resin after disposing an in-mold film 19 in a mold 21 in which a 3D pattern was already formed in a lattice shape. For a better understanding of the invention, a method of forming a transcription layer on the rear face of the already molded injection-molded product 11 by disposing the in-mold film 19 in the mold 21 has been described in brief in FIG. 1. Actually, however, while the injection-molded product 11 is formed into the mold 21, the 3D pattern in the mold 21 is formed on the rear face of the injection-molded product 11 and the transcription layer by the in-mold film 19 is also formed on the rear face of the injection-molded product 11.

The injection-molded product 11 fabricated through this conventional process is adhered to an external case 13, such as illustrated in FIG. 2. In the manner of adhering the injection-molded product 11 to the external case 13, independent coupling protrusions 17 are formed along sides of the injection-molded product 11 such that the coupling protrusions 17 may be engaged with inner walls of the groove 15 when the injection-molded product 11 is engaged with a groove 15 of the external case 13. A combining or adhering substance, such as a double-faced adhesive tape, may be used to adhere the injection-molded product 11 to the external case 13.

Since the injection-molded product 11 is fabricated after the in-mold film 19 is already disposed in the mold 21, it is impossible to form a structure that provides sufficient force by which the injection-molded product 11 can be engaged with a counterpart, i.e. the external case 13. Therefore, the injection-molded product 11 for external decoration of a portable electronic device cannot be directly fabricated as an external case, and is adhered to the already fabricated external case 13, merely providing a simple decoration effect as a type of decorative veneer constructed via the molding process.

This fabrication method separately fabricates an injection-molded product for decoration, causing an increase in the manufacturing costs. In addition, the separately fabricated injection-molded product is assembled in the external case, resulting in an increase in labor and production time required for the fabrication.

SUMMARY OF THE INVENTION

An exemplary aspect of the present invention is to provide a method for fabricating a decorative injection-molded product that is simple in structure and easy to fabricate.

Another exemplary aspect of the present invention provides an injection-molded product fabrication method capable of reducing manufacturing costs by simplifying a structure of a decorative injection-molded product and enabling easier fabrication than known heretofore.

According to still another exemplary aspect of the present invention, there is provided a method for fabricating a decorative injection-molded product. The method includes preparing a mold in which a pattern carved; molding an interim injection-molded product with a pattern carved on an inner face thereof, using the mold; and depositing paint on the inner face of the molded interim injection-molded product. The pattern on the injection-molded product finished by depositing paint is visible from the outside.

Preferably, a material that becomes transparent at least after undergoing stiffening may be used as a molten resin that is stiffened after being injected into the mold in the step of molding an interim injection-molded product.

Preferably, in the step of preparing a mold, a light shielding member may be disposed in the mold before the molten resin is injected, and the light shielding member may be adhered to the interim injection-molded product when the interim injection-molded product is molded.

Preferably, the light shielding member is adhered to the circumference of a part where the pattern is arranged.

Preferably, Ultraviolet (UV) coating may be performed on a paint layer created after the step of depositing paint.

Preferably, in the step of molding an interim injection-molded product, coupling pieces for coupling the finished injection-molded product to a counterpart may be formed, and a material that becomes transparent at least after undergoing stiffening may be used as a molten resin that is stiffened after being injected into the mold.

Preferably, a light shielding member may be disposed in the mold before the molten resin is injected, and the light shielding member may be adhered to the interim injection-molded product when the interim injection-molded product is molded.

Preferably, the light shielding member may be adhered to the circumference of a part in which the pattern is carved, and the coupling pieces may be hidden so that they are not seen from the exterior of the injection-molded product.

Other exemplary aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain exemplary embodiments of the method for fabricating an injection-molded product according to the present invention will become more apparent to a person of ordinary skill in the art apparent from the following description taken in conjunction with the accompanying drawings, in which.

Throughout the drawings, the same drawing reference numerals will be understood to refer to the same elements, features and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary and illustrative, and the claimed invention is not limited to the examples shown and described herein. Accordingly, a person of ordinary skill in the art will recognize that various changes and modifications of the examples shown and described herein can be made without departing from the spirit of the invention and the scope of the appended claims. In addition, descriptions of well-known functions and constructions may be omitted for clarity and conciseness when their inclusion might obscure appreciation of the present invention by the person of ordinary skill in the art.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents. It is to be understood that the singular forms "a," "an," and "the" include plural referents unless the context clearly dictates otherwise. Thus, for example, reference to "a component surface" includes reference to one or more of such surfaces.

Figure 1:
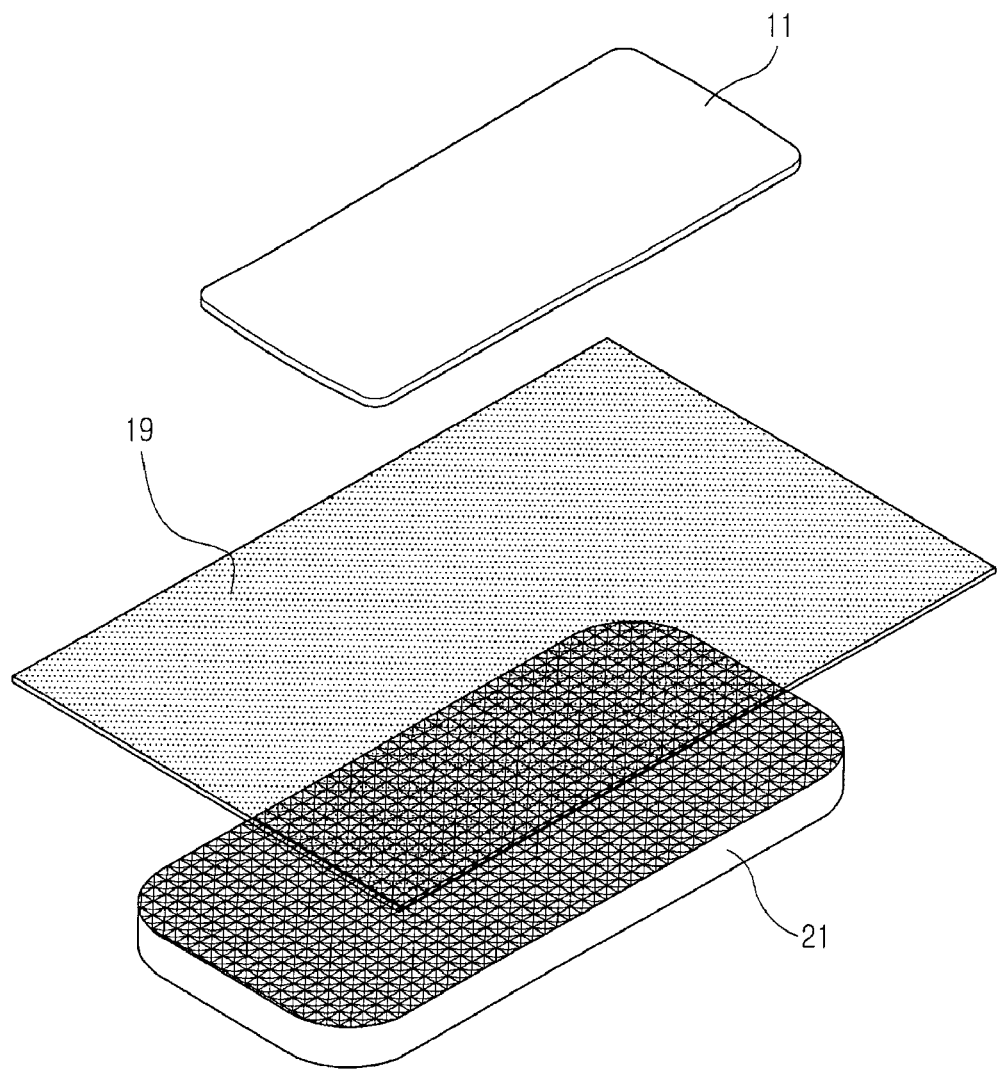
FIG. 1 is a perspective view illustrating a process of fabricating an injection-molded product according to the conventional art.
Figure 2:
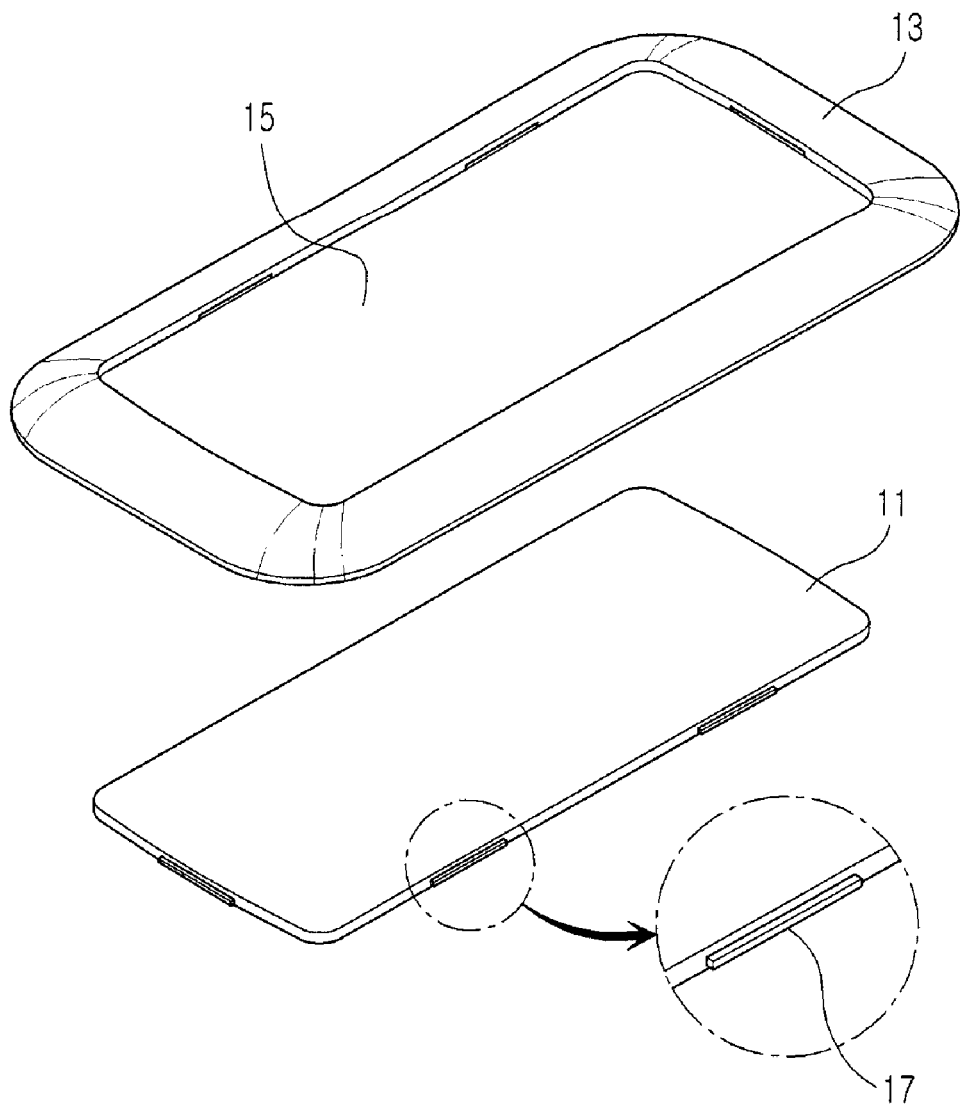
FIG. 2 is a perspective view illustrating application of the injection-molded product fabricated through the conventional process shown in FIG. 1.
Figure 3:
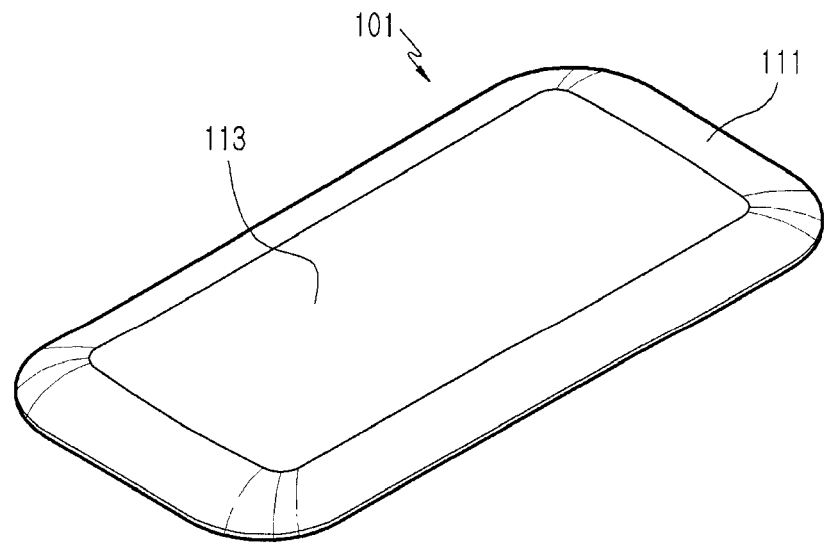
FIG. 3 is a perspective view illustrating an injection-molded product fabricated by an injection-molded product fabrication method according to an exemplary embodiment of the present invention.
Figure 4:
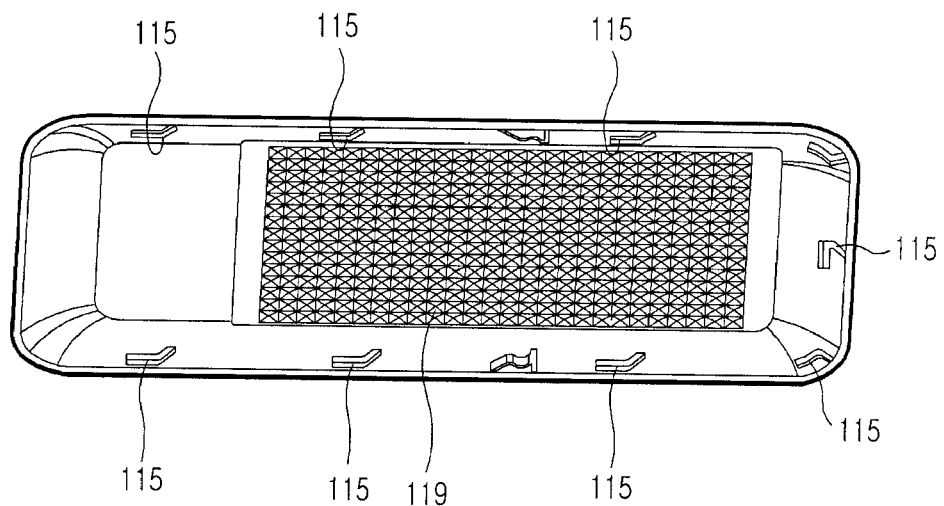
FIG. 4 is a perspective view illustrating the injection-molded product shown in FIG. 3, seen from another direction.

FIG. 3 is a perspective view illustrating an injection-molded product 101 fabricated by an injection-molded product fabrication method according to an exemplary embodiment of the present invention, and FIG. 4 is a perspective view illustrating the rear face, i.e. the inner face of the injection-molded product 101 illustrated in FIG. 3.

As illustrated in FIGS. 3 and 4, the injection-molded product 101 fabricated by the injection-molded product fabrication method according to an exemplary embodiment of the present invention includes a transparent window 113, to which a light shielding member 111 is adhered to a perimeter thereof, so as to surround the light shielding member 111. A three-dimensional (3D) pattern 119 may be carved on the rear face of a part corresponding to the transparent window 113. In an exemplary embodiment, a diamond-shaped lattice pattern is shown as an example of the 3D pattern 119 as illustrated in FIG. 4. The 3D pattern can be designed in various other shapes in addition to the diamond shape. Since the light shielding member 111 is arranged to surround the transparent window 113, the light shielding member is adhered to the circumference of the part where the 3D pattern 119 is carved.

A plurality of coupling pieces 115 are formed on the rear face of the injection-molded product 101, providing a coupling structure for coupling with a counterpart, i.e. another injection-molded product. As the coupling pieces 115 are formed on the rear face of the injection-molded product 101, the injection-molded product 101 can be used by itself as an external case for a portable electronic device or the like. The coupling pieces 115 are located at the circumference of the part where the 3D pattern 119 is carved, and more specifically, at the edges in the rear face of the injection-molded product 101. While the 3D pattern 119 can be visually seen by the user from the outside of the injection-molded product 101 through the transparent window 113, the coupling pieces 115 are hidden from view by the light shielding member 111.

In conclusion, the injection-molded product 101 can be used by alone as an external case of a portable electronic device or the like, and the 3D pattern 119 is visible through the transparent window 113, thereby beautifying the outward appearance of the portable electronic device and the like.

Figure 5:
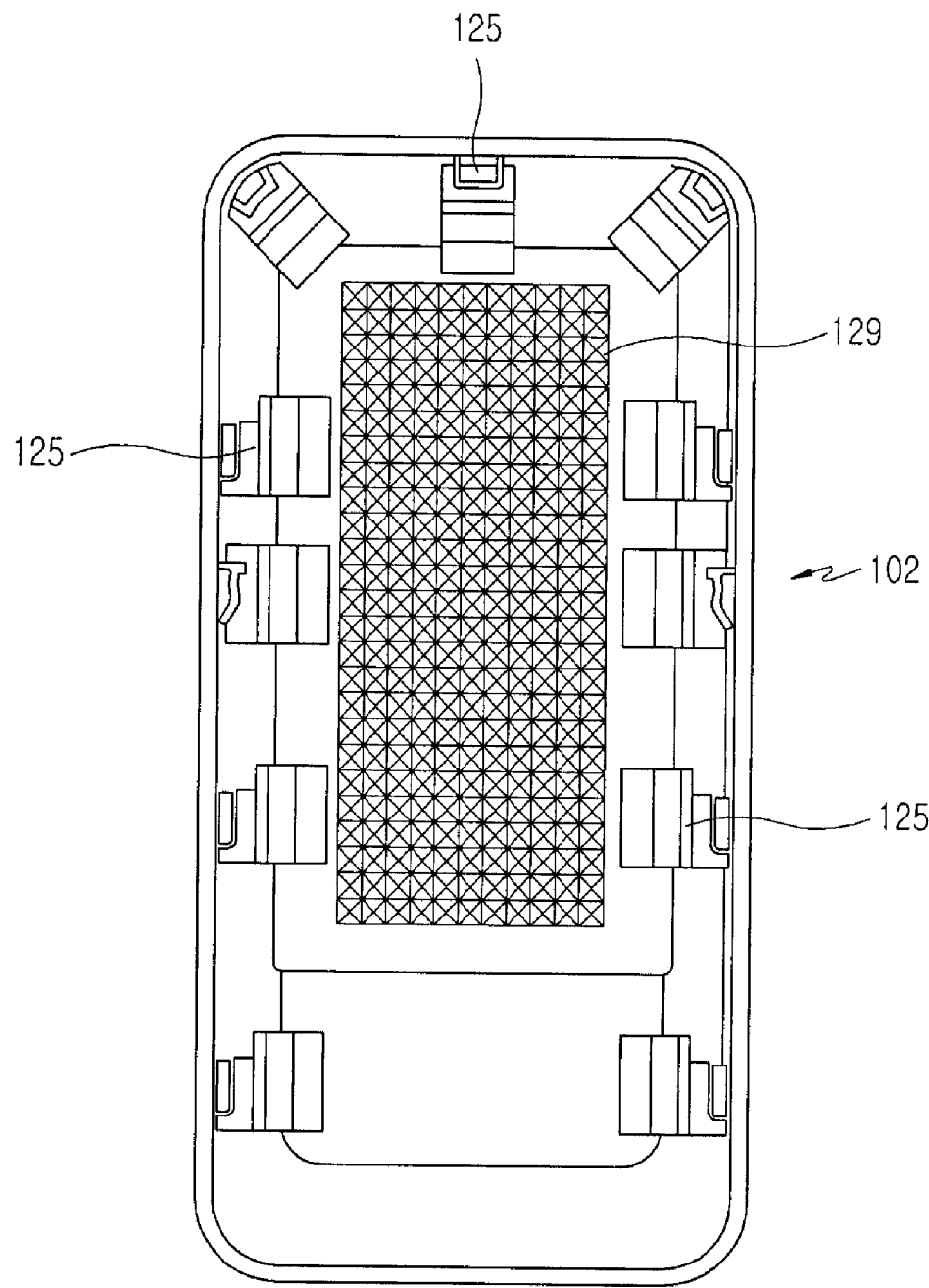
FIG. 5 is a plan view illustrating a first mold for fabricating the injection-molded product shown in FIG. 3.
Figure 6:
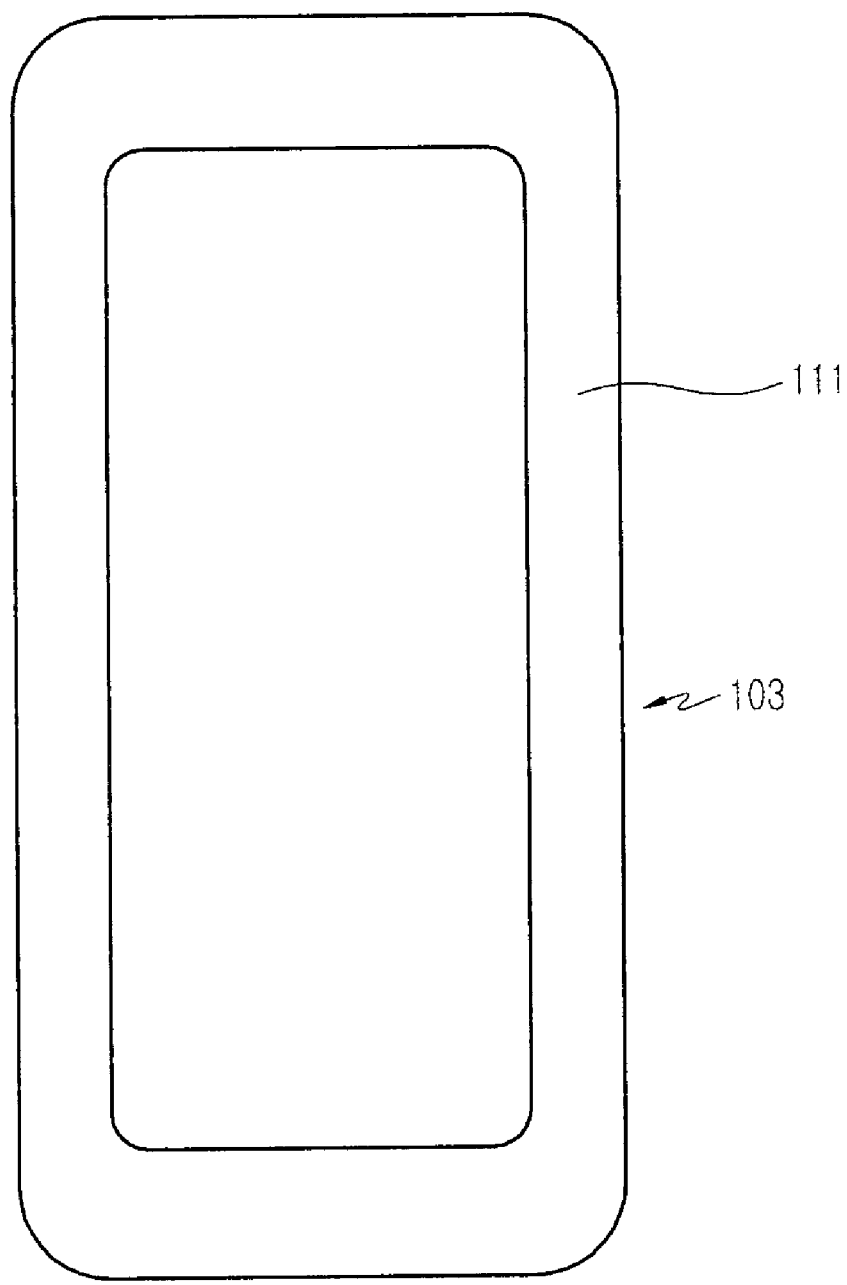
FIG. 6 is a plan view illustrating a second mold for fabricating the injection-molded product shown in FIG. 3.

With reference to FIGS. 5 and 6, a description will now be made of an exemplary method of fabricating the injection-molded product 101.

FIGS. 5 and 6 illustrate respective parts 102 and 103 of a mold used for molding the injection-molded product. When the parts 102 and 103 of a mold, as shown in FIGS. 5 and 6, are combined face to face, a molten resin is injected into the mold, especially between the parts 102 and 103 of the mold, producing an injection-molded product. As described below, the injection-molded product arranged in the mold is not a finished injection-molded product according to the present invention. Therefore, in the following description, the injection-molded product which has been just completely molded in the mold will be referred to as an 'interim injection-molded product'.

The part 102 (hereinafter referred to as a 'first mold 102') of the mold shown in FIG. 5 forms an inner face, or the rear face, of the interim injection-molded product, and another part 103 (hereinafter referred to as a 'second mold 103') of the mold shown in FIG. 6 forms an outer face of the interim injection-molded product. In the state where the first and second molds 102, 103 are coupled face to face, a molten resin is injected into the molds, i.e. between the first and second molds 102, 103, and after the injection, the molten resin is stiffened by cooling, thereby producing the interim injection-molded product.

A 3D pattern 129 corresponding to the 3D pattern 119 to be formed on the rear face of the interim injection-molded product and structures 125 corresponding to the coupling pieces 115 to be formed on the interim injection-molded product are formed on the first mold 102. Although no separate structures or patterns are formed on the second mold 103 in this example, pertinent structures or patterns may be formed depending on design of the goods. Before the second mold 103 is coupled to the first mold 102, the light shielding member 111 is disposed on the second mold 103 so as to be arranged on at least a portion of a perimeter of the second mold.

An injection-molded product fabricated through a separate process, a metallic pressed product, or a light shielding tape/film may be used as the light shielding member 111, forming an external appearance of the desired injection-molded product to be fabricated.

When the formed first and second molds 102, 103 are combined face to face, a molten resin is injected into the molds. Preferably, the molten resin injected into the molds comprises a material that becomes transparent at least after it has stiffened, since the 3D pattern 119 formed on the rear face of the injection-molded product 101 should be visible from the outside.

Meanwhile, the coupling pieces 115 do not necessarily have to be formed on the interim injection-molded product. In most cases, however, since injection-molded products used as external cases of portable electronic devices and the like require a means for coupling with another external case, the coupling pieces 115 are formed, by way of example, in this exemplary embodiment.

Since the interim injection-molded product shown in FIGS. 5 and 6 is made of a transparent material, so that in the finished product shown in FIGS. 3 and 4, the 3D pattern 119 can be seen from the exterior, the coupling pieces 115 can also be seen from the outside. The coupling pieces 115 are hidden so that they are not shown as the external appearance of the portable electronic device, and the injection-molded product 101 has the light shielding member 111 so that it is protected from an impact. As described above, the already fabricated light shielding member 111 is disposed on the second mold 103, and when a molten resin is injected into the mold and then stiffened, the interim injection-molded product is finished, with the light shielding member 111 adhered thereto.

Preferably, paint is deposited on the rear face of the interim injection-molded product so that the 3D pattern 119 may be more clearly seen from the outside of the injection-molded product 101. A color of the paint deposited on the rear face of the interim injection-molded product may be properly selected according to use of the desired injection-molded product to be fabricated. After deposition and drying of the paint is completed, it is preferable to perform Ultraviolet (UV) coating to prevent the dried paint layer from being damaged.

A person of ordinary skill in the art understands that the invention is not limited to a using paint, and any type of coloring layer that may be comprised of coloring agents can be used including dyes, pigments, inks, etc., just to name a few ways to color the product.

The injection-molded product fabricated through the above process can be used as an external case for a portable electronic device and the like. In case of a portable electronic device with a built-in battery pack, the injection-molded product can be used as a cover that closes the space where the battery pack is mounted.

As is apparent from the foregoing description, the injection-molded product fabrication method according to the present invention can form a 3D pattern on the rear face or the inner face of the injection-molded product and also form structures such as coupling pieces for coupling with a counterpart, i.e. another injection-molded product, on the face where the 3D pattern is formed. Therefore, the goods fabricated by injection molding can beautify and diversify their outward appearances by themselves, without adhering separate injection-molded products or decorations for decorating the outward appearance of the portable electronic devices and the like. In addition, since there is no need to install separate injection-molded products for external decoration, the number of parts used for manufacture substantially decreases, thereby improving structural safety of information devices and simplifying the assembly process. As a result, the manufacturing costs of the portable electronic devices and the like are reduced, so that users can purchase portable electronic devices having elegant appearances without substantially increased costs.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for fabricating an injection-molded product, comprising:
   preparing a mold formed of two portions into which a pattern has been carved into an inner face of at least one portion of the mold;
   disposing a light shielding member within the mold;
   injecting a molten resin into the mold;
   stiffening the resin to fabricate an interim injection molded product, and adhering the light shielding member to the interim injection molded product and forming the pattern on the rear face;
   depositing a coloring layer on the pattern on the rear face of the interim injection-molded product to provide a colored pattern to transform the interim injection-molded product into an injection molded finished product having the pattern with the coloring layer thereon the rear face;
   wherein the resin is transparent when stiffened so that the injection-molded finished product is transparent on top of the rear face, and having a border around a perimeter of the top of the rear face comprising a light shielding portion so that the top of the injection-molded finished product substantially corresponds to the colored pattern when viewed from an exterior of the finished injection molded product through the transparent top of the rear face, and wherein the transparent top of the rear face is not in contact with the colored pattern.

2. The method according to claim 1, wherein the coloring layer comprises paint and the pattern comprises a three-dimensional (3D) pattern.

3. The method of claim 1, wherein the light shielding member is adhered to a circumference of a part of the interim injection-molded product where the pattern is arranged.

4. The method of claim 1, wherein the light shielding member is adhered to a perimeter of a part of the interim injection-molded product.

5. The method of claim 1, further comprising (d) applying an Ultraviolet (UV) coating on the coloring layer deposited on the rear face of the molded interim injection-molded product.

6. The method of claim 1, further comprising forming coupling pieces for coupling the finished injection-molded product to a counterpart is formed in step (b).

7. The method of claim 1, wherein the light shielding member is adhered to a circumference of a part of the interim injection-molded product in which the pattern is arranged, and the coupling pieces are hidden by the light shielding member so that they are invisible from the exterior of the finished injection-molded product.

8. The method of claim 1, wherein the light shielding member is adhered to a perimeter of a part of the interim injection-molded product, and the coupling pieces are hidden by the light shielding member so that they are invisible from the exterior of the finished injection-molded product.

* * * * *